March 17, 1942. A. BAERENKLAU 2,276,606
REPAIR PLUG
Filed Aug. 26, 1940
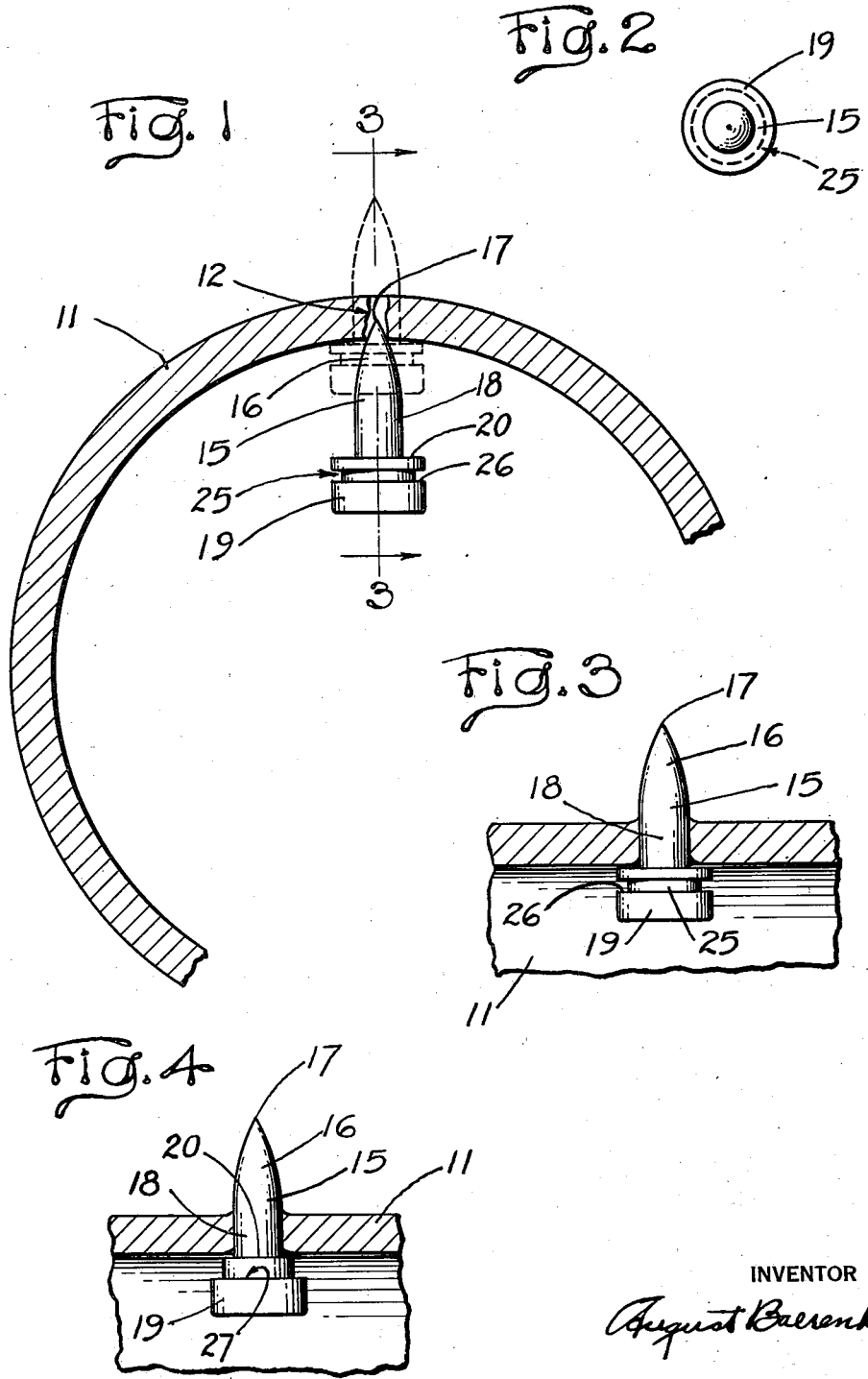
INVENTOR
August Baerenklau Patented Mar. 17, 1942

2,276,606

UNITED STATES PATENT OFFICE 2,276,606

REPAIR PLUG

August Baerenklau, Queens Village, N. Y.

Application August 26, 1940, Serial No. 354,331

1 Claim. (Cl. 138—97)

My invention relates generally to repair plugs and in particular to the improvement in such plugs adapted for use in the repair, in situ, of leaks difficult of access, such as those in pipes or the tubes of fire-tube boilers.

An object of the invention is to provide a repair plug with a nose portion adapted to clear, compact and enlarge the walls of a leak hole, and a cylindrical or slightly tapered shank portion to seal the hole thus enlarged and prepared by the nose.

Another object of the invention is the provision, on such a plug, of a head having a recess in a lateral surface whereby a hold may be obtained to extricate the plug when necessary.

Many other objects and advantages of the invention will be apparent as it is better understood from the following description, which, taken together with the accompanying drawing, discloses a preferred embodiment thereof.

Referring to the drawing:

Fig. 1 shows a partial cross sectional view of a tube, and a plug, embodying a preferred form of my invention, in position relative to a leak hole in the tube;

Fig. 2 is an end view of the plug shown in Fig. 1;

Fig. 3 is a longitudinal section of a portion of the tube, taken substantially along the line 3—3 in Fig. 1 and showing the plug driven into sealing position in the leak hole, and Fig. 4 shows a modified form of my invention in a section similar to that of Fig. 3.

Prior to this invention, the repair of tubes in situ, such as those in low-pressure, fire-tube boilers, afforded a serious problem to the owners as well as to the repairers of the boilers. Heretofore, when a leak occurred during operation of such a boiler, the usual way to repair a tube was to shut down the boiler, plug both ends of the defective tube, and continue operation with one less tube until the boiler could be shut down again for a time long enough to permit removal of the defective tube for repair or replacement. This procedure led to reduced efficiency of boilers when their use was in most urgent demand because the plugged tube decreased the heat-transferring area of the boiler. Repairs of this kind were also costly because of the need to hasten work to place a boiler back into service.

These difficulties, and others, are either eliminated or greatly minimized by use of the present invention which makes possible the repair of a leak in a fire tube in practically the same time that it would take to plug the tube ends in the old procedure abovementioned. This will be more obvious after a reading of the following description.

In Fig. 1 is shown a cross section of a tube 11 with a leak hole 12 at the top thereof. Leak holes in fire tubes usually break through from the outside at the top because this is the place where oxygen-holding bubbles in the water come to rest on the tubes, and there aid in accelerating corrosion.

Numeral 15 designates, generally, a one-piece substantially non-deformable repair plug which embodies a preferred form of my invention. This plug comprises a conoidal, or substantially paraboloidal nose 16 terminating at one end in a sharp, or slightly rounded point or tip 17. This nose portion merges at its base with a cylindrical or slightly tapered or frusto-conoidal shank 18 of the plug, which is formed integrally with a head 19 that forms a shoulder 20 with the shank in the plane on which the shank and head are united. If the shank is slightly tapered, the large diameter is adjacent the shoulder 20.

Hereinafter I shall refer to the integrated nose 16, point 17 and shank 18 as the conoidal body of the plug 15. I intend that the term "conoidal" shall include all forms resembling or approaching a cone in shape. Therefore, the forms mentioned in the preceding paragraph are merely exemplary of the forms contemplated by the instant invention.

Furthermore, I expressly include within the term "conoidal" all such forms abovementioned in which the contour of transverse section taken normal to the axis of the body is circular or polygonal or approaching such geometrical figures in general contour. Therefore, the broader term "conoidal" includes such forms as "bullet-shaped" and "pyramidal."

To apply this plug, the plumber or repairman first locates the leak hole by throwing light into the tube, and observes the trickle or jet of water entering the tube which aids considerably in the subsequent placement of the plug. The tip 17 of the plug is then placed in the leak hole as shown in Fig. 1, and the plug driven home to the position shown in dotted lines in the same figure, and in full in Figs. 3 and 4. The plug may be driven or forced home in any suitable manner such as by lever and block, by wedge action, or by means of a tool which is the subject matter of another application (Serial No. 354,332) in which I am a joint applicant.

A plug so driven to sealed position will stop a leak even where the pressure differential between the inside and outside of the tube is quite great, and has proven extremely efficient when used in the repair of low-pressure, fire-tube boilers.

In being driven home, the conoidal body of the plug effects several operations. First, the nose 16 loosens the corroded metal within the hole and urges it laterally of the plug and outwardly of the tube. Simultaneously, the nose of the plug enlarges the hole and thereby compacts the more solid metal into the walls of the hole. The shank then follows to plug the enlarged hole prepared by the nose.

Because of the gentle curvature of the nose 16, a minimum of strain is imposed on the tube wall and a packing action results which forces the material of the tube laterally of the plug. In this manner, a harder and less porous wall is built up around the plug and a more effective seal between plug and tube results. As it is essential to have a plug which resists breakage or deformation under these strains, the material of which it is made should, preferably, be harder than the material being repaired. I have found that a plug of case-hardened steel proved satisfactory in the repair of boiler tubes.

When the conoidal body of the plug has reached sealing position, the shoulder 20 engages the inner surface of the tube and the operator knows, either by visual observation, or by sensing the contact through the means he employs to drive the plug, that the sealing position has been reached. In this position, the nose of the plug projects outwardly of the tube and the outer surface of the shank engages the wall of the hole substantially throughout the length of the hole, and may partly project beyond the tube wall. The tight frictional contact between the walls of shank and hole is, of course, more effective to withstand inwardly directed pressure when the length of contact is greatest and the amount of taper is not too great.

It sometimes occurs that, after a plug has been driven home, the leak is not entirely stopped. This is usually due to the irregular shape of the hole, or the crumbling away of a corroded portion of the tube adjacent to the plug. It is then necessary to remove the plug and replace it with another of larger diameter at the shank. To facilitate the removal of a plug under such conditions, I have provided a recess, such as an annular groove 25, in the head of the plug. This groove, shown in Figs. 1, 2 and 3, affords a means to obtain a purchase or hold on the plug by a suitable prying tool, the tool end bearing on the wall 26 of the groove. For the same purpose, I may merely form the head with a second extended shoulder 27, as shown in Fig. 4, which would serve in the same manner as the wall 26 in providing a means for obtaining a purchase on the plug by the end of an extricating tool.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

A substantially non-deformable, one-piece repair plug of case hardened steel or the like for repairing boiler tube leaks, comprising a substantially conoidal body terminating at one end in a point, an enlarged head on the end of said body remote from said point and forming a shoulder with said body, and an annular ledge around the perimeter of said head, said ledge having a face substantially normal to the plug axis, said plug being adapted to be driven home by pressure applied straightforwardly until a portion of the outer surface of said body is in secure force fit sealing engagement with the walls of said leak hole, said ledge face serving as means whereby purchase on said plug may be had for the purpose of extricating it from said hole.

AUGUST BAERENKLAU.